United States Patent [19]

Suzuki et al.

[11] Patent Number: 5,318,329
[45] Date of Patent: Jun. 7, 1994

[54] FLEXIBLE JOINT FOR AN EXHAUST PIPE

[75] Inventors: Kenji Suzuki, Aichi; Sumio Ogawa, Nagoya; Sunao Sakamoto, Toyota, all of Japan

[73] Assignee: Toyota Jidosha Kabushiki Kaisha, Toyota, Japan

[21] Appl. No.: 896,179

[22] Filed: Jun. 10, 1992

[30] Foreign Application Priority Data

Jun. 14, 1991 [JP] Japan .................. 3-169110
Jun. 25, 1991 [JP] Japan .................. 3-178912

[51] Int. Cl.⁵ .............................. F16L 27/00
[52] U.S. Cl. ........................ 285/49; 285/114; 285/301; 285/227
[58] Field of Search ............. 285/49, 227, 299, 300, 285/301, 226, 47, 114

[56] References Cited

U.S. PATENT DOCUMENTS 4,659,117 4/1987 Holzhausen et al. ............. 285/49
4,893,847 1/1990 Hess .......................... 285/226
5,090,746 2/1992 Holzhausen ................... 285/910

FOREIGN PATENT DOCUMENTS 1089226 9/1960 Fed. Rep. of Germany .
2029537 3/1980 United Kingdom .
2107816 5/1983 United Kingdom .
2125502 3/1984 United Kingdom .
2230581 10/1990 United Kingdom .

Primary Examiner—Paula A. Bradley
Assistant Examiner—Jeffrey T. Knapp
Attorney, Agent, or Firm—Kenyon & Kenyon

[57] ABSTRACT

A flexible joint has a bellows, a first support cover connected with one end of the bellows, a second support cover connected with another end of the bellows, a pin fixed to the first support cover, a cap fixed to the second support cover, and a buffer member constructed of wire mesh and disposed between the first support cover in combination with the pin and the second support cover in combination with the cap. The buffer member includes two portions different in modulus of elasticity. Due to the structure, gap generation between the first support cover combined with the pin and the second support cover combined with the cap is prevented.

16 Claims, 9 Drawing Sheets

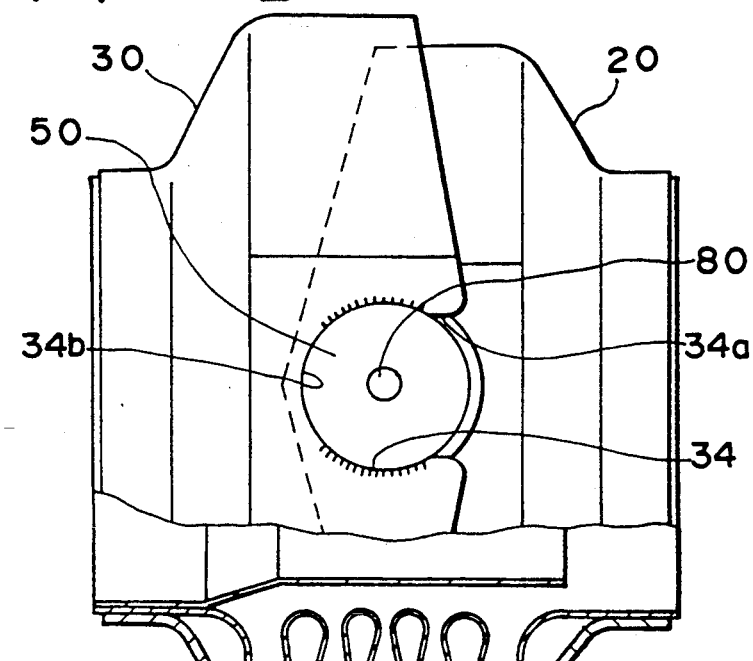
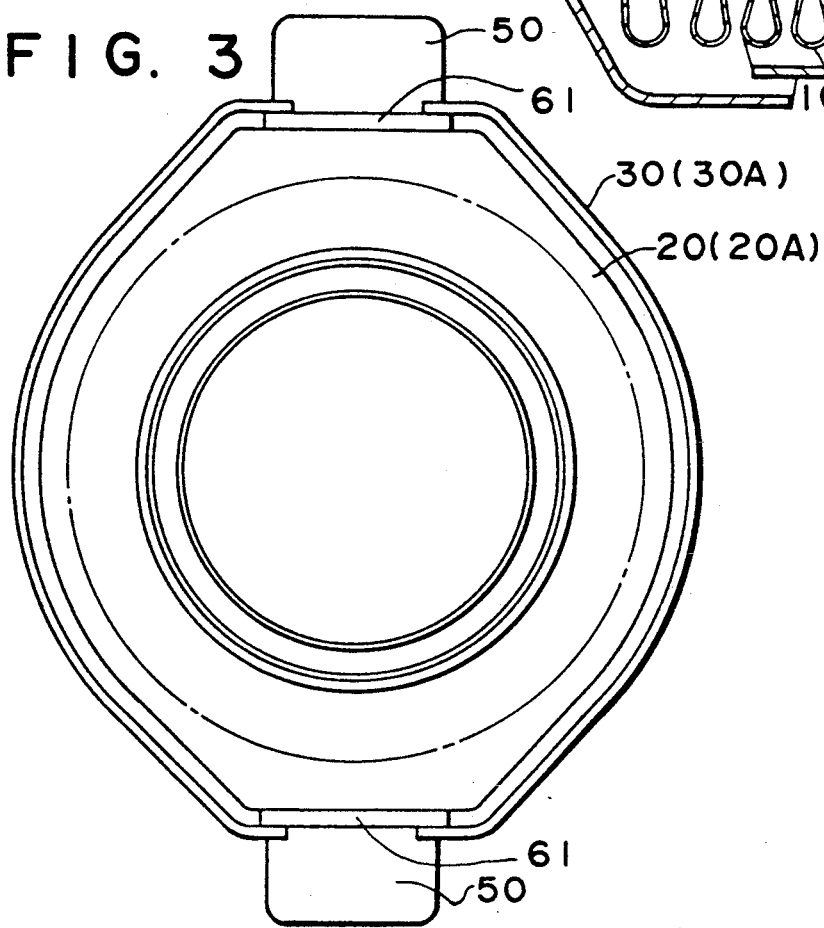

FLEXIBLE JOINT FOR AN EXHAUST PIPE

BACKGROUND OF THE INVENTION

1. Field of the Invention

The present invention relates to a flexible joint for an exhaust pipe connected to an internal combustion engine mounted in a vehicle.

2. Description of the Related

The applicant proposed a flexible joint for an exhaust pipe in Japanese Utility Model Application Number HEI 2-21841 filed on Mar. 6, 1990 (not yet published as of Jun 14, 1991). The flexible joint has a structure shown in FIG. 12. More particularly, the flexible joint includes a bellows 1, a first support cover 2 fixed to one end portion of the bellows 1, a second support cover 3 fixed to another end portion of the bellows 1, a pair of diametrically opposed pins 4 and 4' fixed to the first support cover 2, a pair of diametrically opposed caps 5 and 5' fixed to the second support cover 3, and a pair of buffers 6 and 6' disposed between the pins 4 and 4' and the respective caps 5 and 5'. Each of the buffers 6 and 6' is formed as a single member of wire mesh having the configuration of a hat with a crown and a brim.

However, there is a problem with the hat-configured buffer in that it is difficult to make this buffer by a press operation so that the crown has a sufficient wire mesh density. As a result, when a large load acts on the crown of the hat-configured buffer, the crown is deformed and worn until finally a gap is created between the buffer and at least one of the pin and the cover, which causes the flexible joint to rattle when vibration from an engine is transmitted to the flexible joint via an exhaust pipe.

SUMMARY OF THE INVENTION

An object of the invention is to provide a flexible joint having a buffer wherein generation of a gap and a rattle or striking sound due to such a gap are prevented or suppressed.

This object is achieved with an exhaust pipe in accordance with the present invention. More particularly, the flexible joint includes: a bellows having an axis, a first end portion and an opposite second end portion; a first support cover having a first end portion fixed to the first end portion of the bellows, and an opposite second end portion extending toward the second end portion of the bellows outside the bellows; a second support cover having a first end portion fixed to the second end portion of the bellows and an opposite second end portion extending toward the first end portion of the bellows outside the first support cover, the second support cover having a slot formed therein; a pin fixed to the first support cover and having an axis extending in a direction perpendicular to the axis of the bellows from the first support cover through the slot of the second support cover to outside of the second support cover; a cap spaced from the pin and fixed to the second support cover so as to cover the pin; and a buffer member disposed in a space defined between the first support cover in combination with the pin and the second support cover in combination with the cap. The buffer member includes a first portion and a second portion which have different coefficients of elasticity and are arranged in parallel with each other between the the first support cover combined with the pin and the second support cover combined with the cap. Alternatively, the buffer member may be constructed such that the buffer member includes a cylinder portion and a flange portion which are constructed separately from each other and formed from wire mesh.

In the case where the buffer member has the first and second portions with different coefficients of elasticity, since no deformation is yet generated in the buffer member at an early stage of use, no gap yet occurs, and loads will be born mainly by the first portion (the portion having a higher coefficient of elasticity). After a relatively long time period of use, a plastic deformation will be caused in the first portion, but little plastic deformation will be caused in a second portion (the portion having a lower coefficient of elasticity), because the second portion still can be elastically deformed. As a result, little gap will be created between the second portion and at least one of the pin and the cap, and no striking sound will be generated.

In the case where the buffer member has the cylinder portion and the flange portion, since the cylinder portion and the flange portion are constructed separately from each other, a wire mesh density of the cylinder portion is not affected by the flange portion during press. As a result, the cylinder portion can be constructed so as to have a uniform and high wire mesh density, which prevents generation of a gap between the buffer member and at least one of the pin and the cap.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 2 is a plan view of the joint of FIG. 1;

FIG. 3 is a front elevational view of the joint of FIG. 1;

DETAILED DESCRIPTION OF THE PREFERRED EMBODIMENTS

Figure 9:
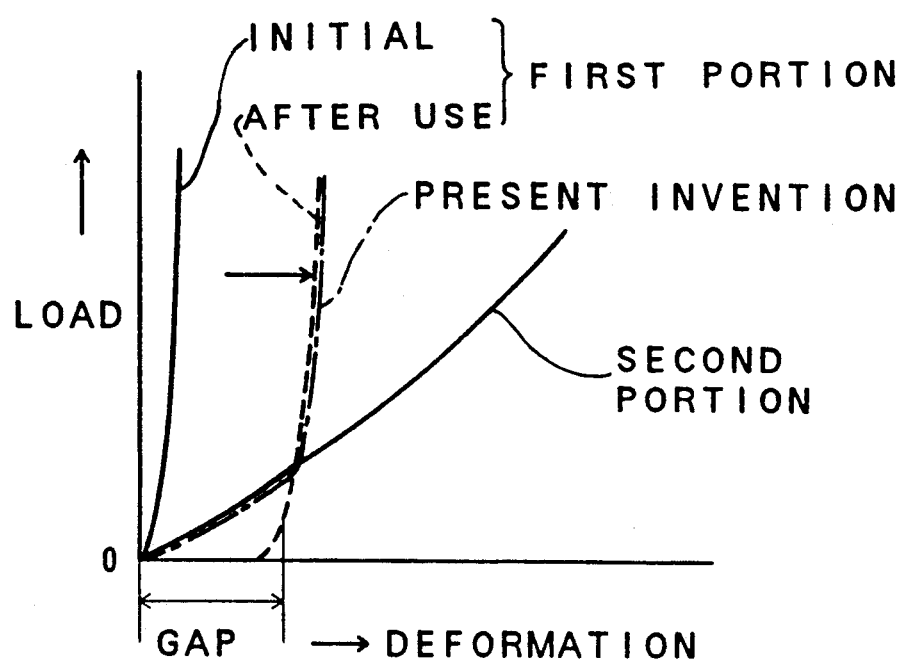
FIG. 9 is a graphical representation of a load versus deformation characteristic of a buffer member applicable to both the joint in accordance with the first embodiment and the joint in accordance with the second embodiment.
Figure 10:
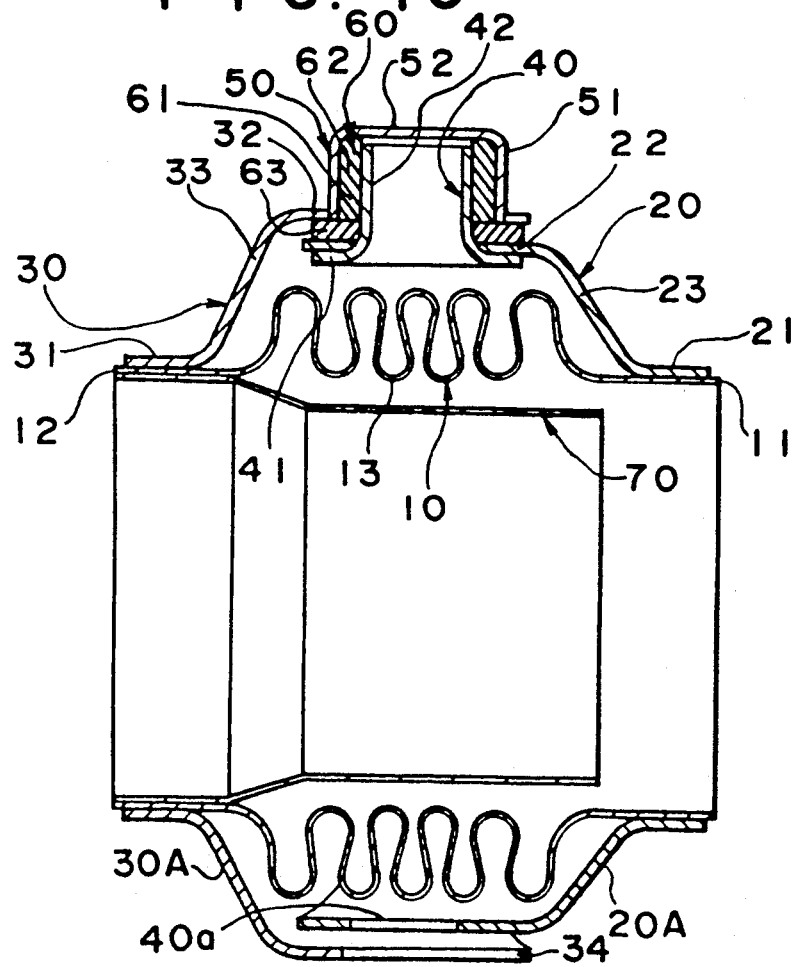
FIG. 10 is a cross-sectional side elevational view of a flexible joint for an exhaust pipe in accordance with a third embodiment of the present invention.
Figure 11:
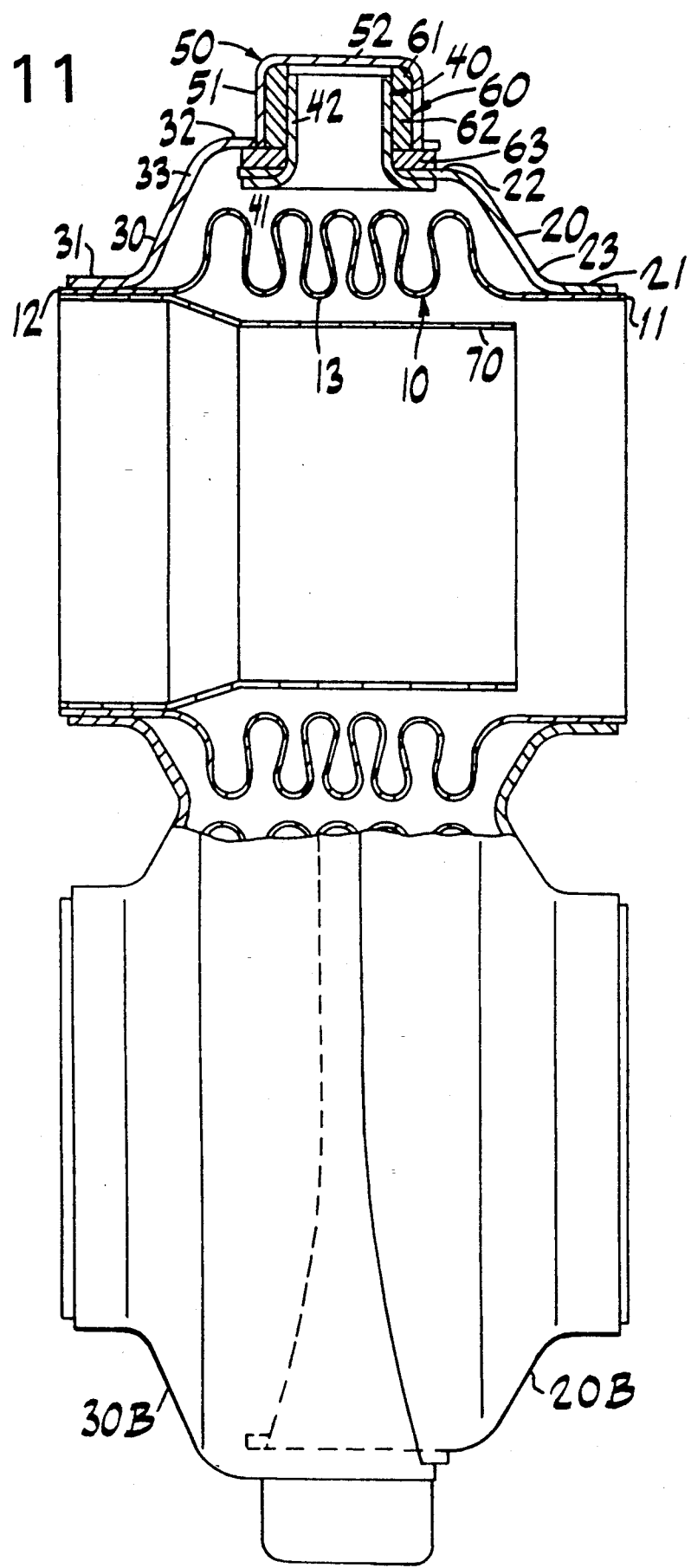
FIG. 11 is a partially cross-sectioned side elevational view of a flexible joint for an exhaust pipe in accordance with a fourth embodiment of the present invention.

Four embodiments of the present invention will be explained. A first embodiment is shown in FIGS. 1-3 and 7-9 and relates to a single bellows-type joint having a buffer member which includes portions different in modulus of elasticity; a second embodiment is shown in 4-6 and 7-9 and relates to a double bellows-type joint having a buffer member which includes portions different in modulus of elasticity; a third embodiment is shown in FIG. 10 and relates to a single bellows-type joint having a buffer member including a cylinder portion and a flange portion which are constructed separately from each other; and a fourth embodiment is shown in FIG. 11 and relates to a double bellows-type joint having a buffer member including a cylinder portion and a flange portion which are constructed separately from each other. Throughout all the embodiments, the same structural portions are denoted by the same reference numerals.

First, structures common to all the embodiments will be described.

A flexible joint for an exhaust pipe generally includes a bellows 10, a first support cover 20, a second support cover 30, a pin 40, a cap 50, and a buffer member 60.

The bellows 10 has an axis, a first end portion 11, an opposite second end portion 12, and a central portion 13 connecting the first end portion 11 and the second end portion 12. Exhaust pipes (not shown) of an internal combustion engine (not shown) are inserted into the first end portion 11 and the second end portion of the bellows 10, respectively, and are fixed to the first and second end portions 11 and 12 by welding.

The first support cover 20 has a first end portion 21, an opposite second end portion 22 having a larger diameter than the first end portion 21, and a central portion 23 connecting the first end portion 21 and the second end portion 22 and expanding in diameter toward the second end portion 22. The first end portion 21 of the first support cover 20 is fixed by welding to the first end portion 11 of the bellows 10 and to the exhaust pipe inserted into the first end portion 11 of the bellows 10. The second end portion 22 of the first support cover 20 extends toward the second end portion 12 of the bellows 10 outside the bellows 10 so as to cover the central portion 13 of the bellows 10 from outside. A pair of diametrically opposed holes 40a (see lower portion of FIG. 1 and FIG. 10) are formed in the second end portion 22 of the first support cover 20 located radially outside of the central portion 13 of the bellows 10, so that the pins 40 extend through the holes and are fixed to the first support cover 20. (The second pin and cap assembly is not shown on the lower portion of FIG. 1 or 10 for simplicity.)

The second support cover 30 has a first end portion 31, an opposite second end portion 32 having a larger diameter than the first end portion 31, and a central portion 33 connecting the first end portion 31 and the second end portion 32 and enlarged in diameter toward the second end portion 32. The first end portion 31 of the second support cover 30 is welded to the second end portion 12 of the bellows 10 and to the exhaust pipe inserted into the second end portion 12 of the bellows 10. The second end portion 32 of the second support cover 30 extends toward the first end portion 11 of the bellows 10 outside the bellows 10. The second end portion 32 of the second support cover 30 has a larger diameter than the diameter of the second end portion 22 of the first support cover 20 so that the second end portion 32 of the second support cover 30 receives the second end portion 22 of the first support cover 20 therein.

A pair of diametrically opposed slots 34 are formed in the second end portion 32 of the second support cover 30 in alignment with the holes 40a in the first support cover 20. As more clearly illustrated in FIG. 2, each of the slots 34 has a first portion 34a having parallel sides and extending from an edge of the second end portion 32 toward the first end portion 31 of the second support cover 30 and a partial-circular second portion 34b communicating to the first portion 34a and having a diameter larger than the distance between the parallel sides of the first portion 34a. The pins 40 extend through the second portions 34b of the slots 34. Each of the caps 50 has an outside diameter equal to the diameter of the second portion 34b of the slot 34. Each cap 50 is fitted into the second portion 34b of the slot 34 and is welded to the support cover 30. Since the distance between the sides of the first portion 34a of the slot 34 is smaller than the outside diameter of the cap 50, the cap 50 is easily maintained in position in the second portion 34b of the slot 34 without moving toward the first portion 34a of the slot 34 during welding.

Figure 1:
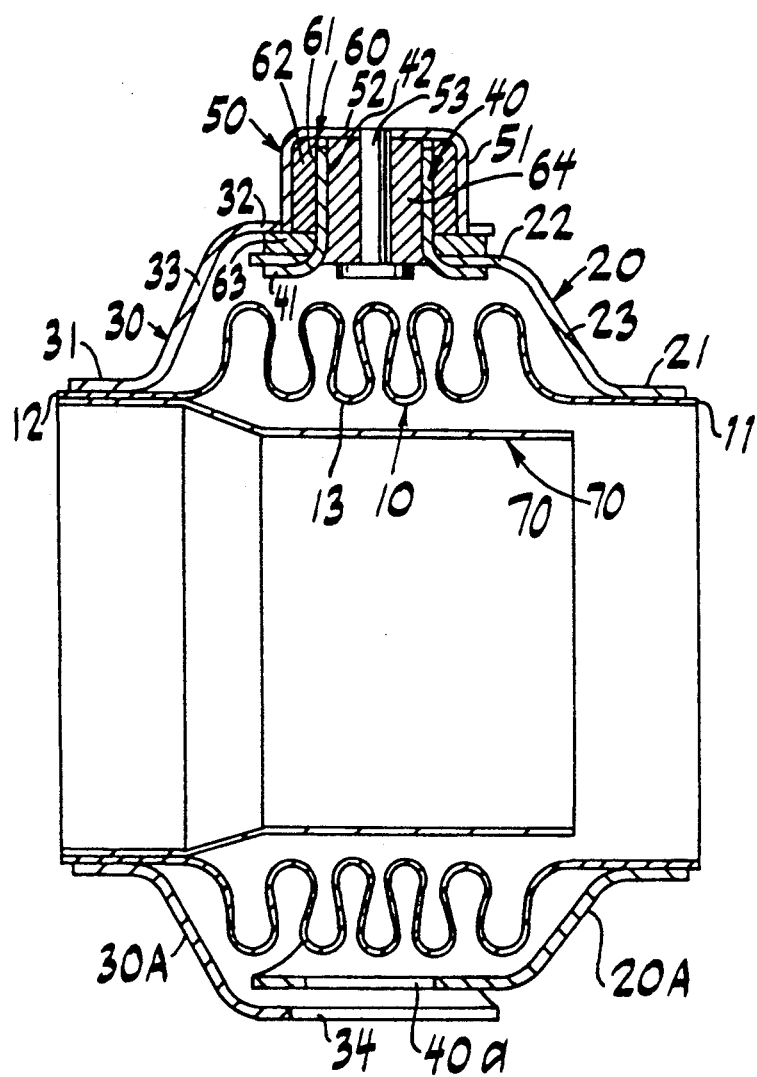
FIG. 1 is a cross-sectional view, in a plane containing the pin axis, of a flexible joint for an exhaust pipe in accordance with a first embodiment of the present invention.
Figure 4:
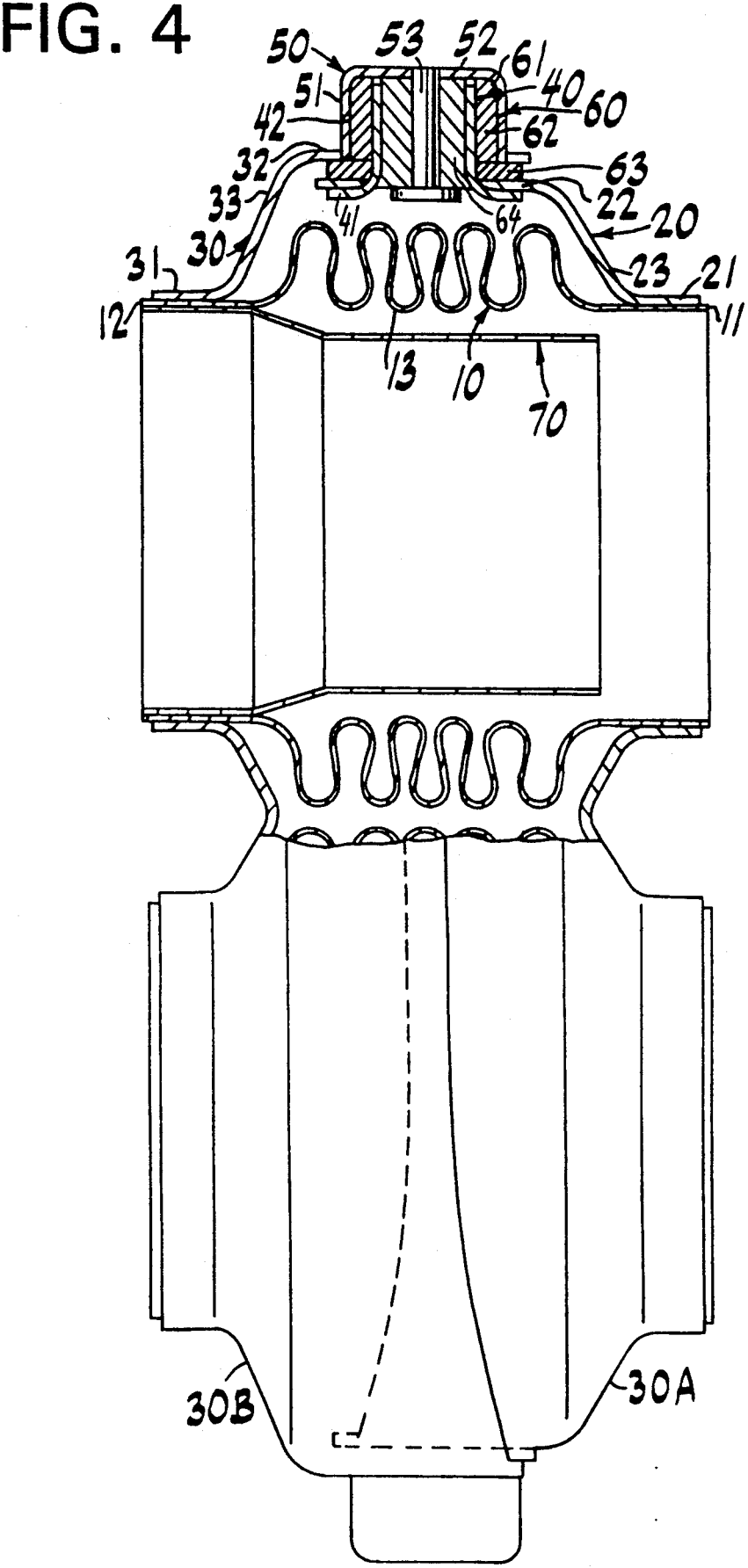
FIG. 4 is a partially cross-sectioned side elevational view of a flexible joint for an exhaust pipe in accordance with a second embodiment of the present invention.
Figure 5:
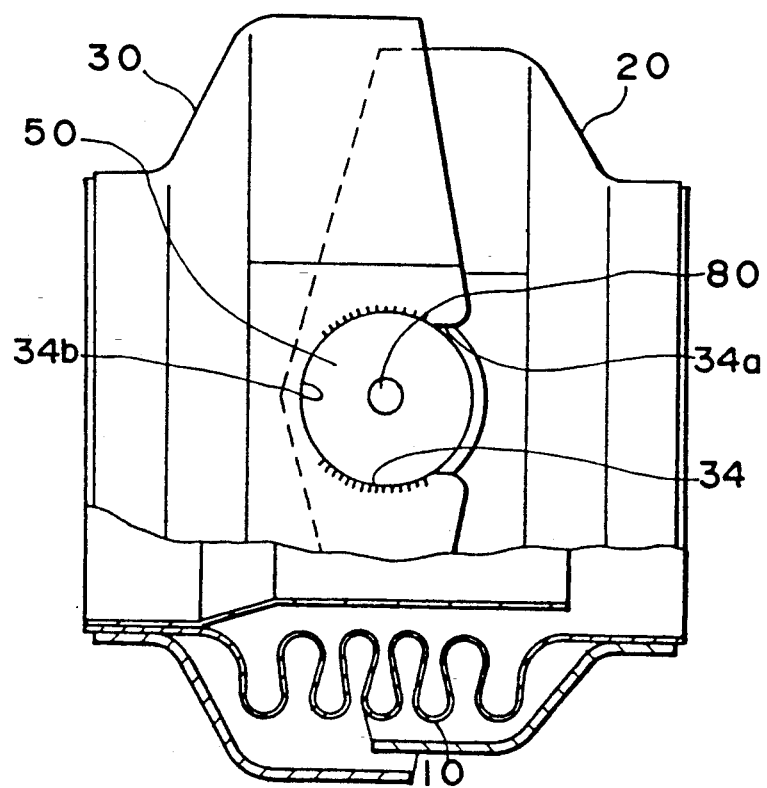
FIG. 5 is a partially cross-sectioned plan view of the joint of FIG. 4.
Figure 6:
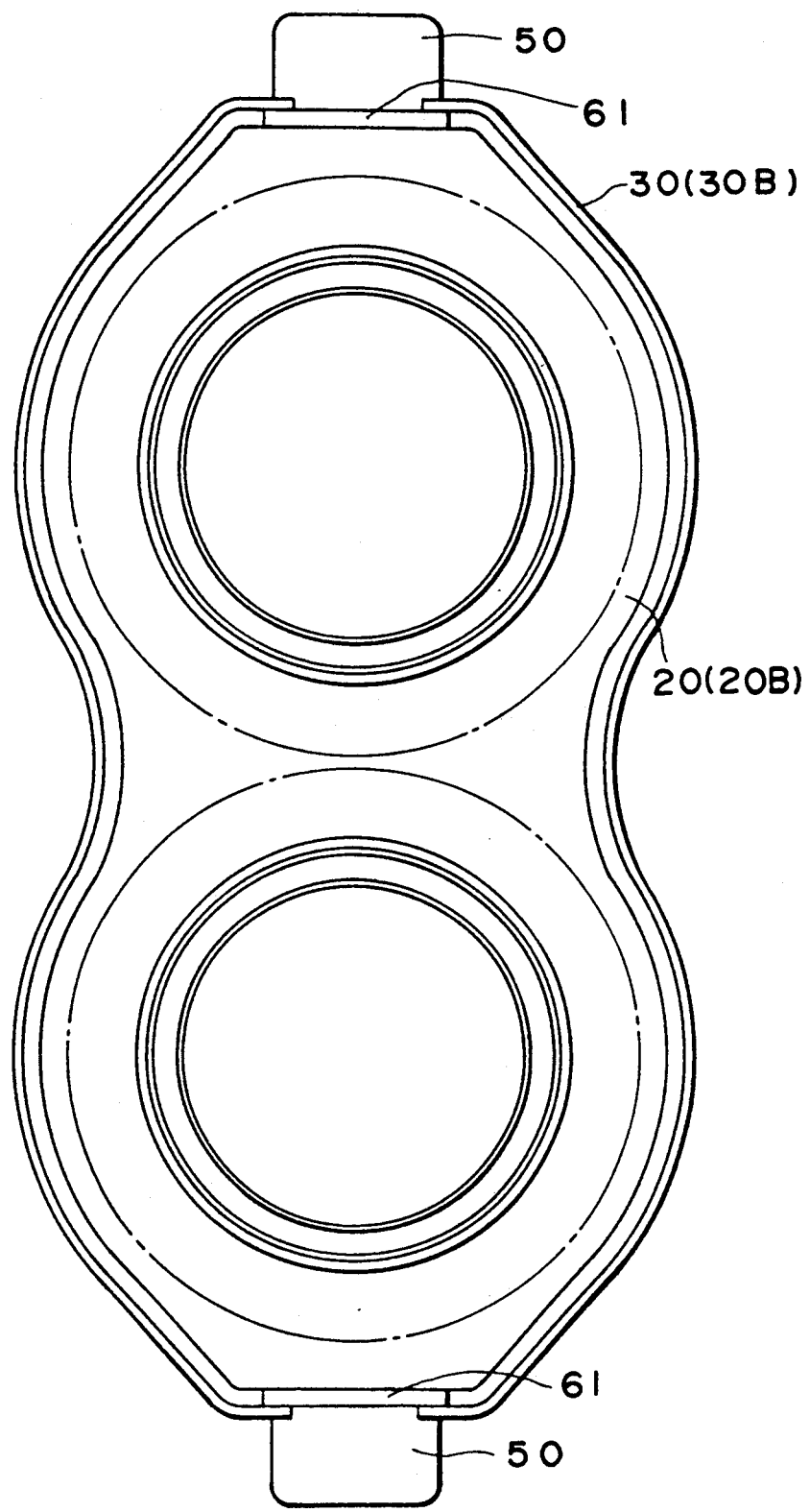
FIG. 6 is a front elevational view of the joint of FIG. 4.
Figure 7:
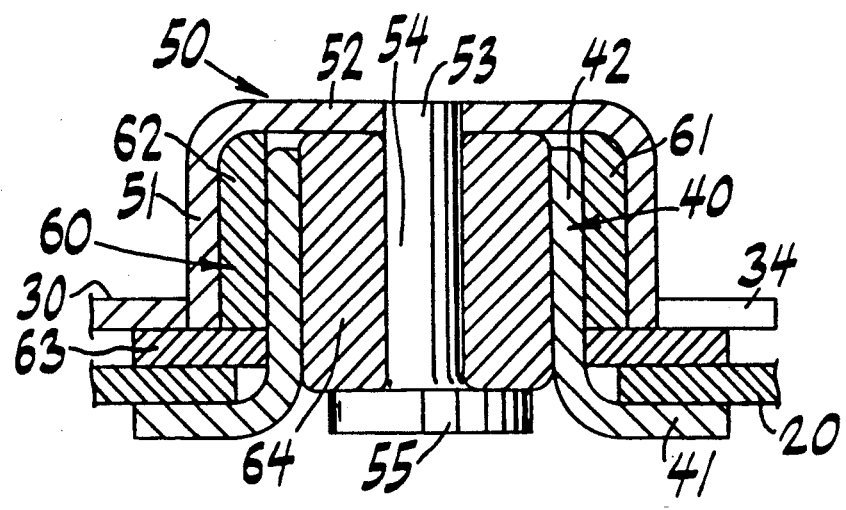
FIG. 7 is an enlarged cross-sectional view of a pin, cap and buffer member assembly applicable to both the joint in accordance with the first embodiment and the joint in accordance with the second embodiment.

As illustrated in FIG. 7, each pin 40 has a cylinder 42 and a flange 41 integrally connected to one end of the cylinder 42. Another end of the cylinder 42 is open so that the cylinder 42 has no end plate or bottom. Due to this open-ended construction, the pin 40 can be formed to have a relatively long axial length, which increases the bearing surface area of the pin 40, thus decreasing the load per unit area acting on the buffer member 60. Each pin 40 is inserted into the corresponding pin hole 40a from inside the first support cover 20 until the flange 41 contacts the inside surface of the first support cover 20. At this state, the pin 40 is welded to the first support cover 20.

The cylinder 42 of each pin 40 extends outward through the pin hole 40a of the first support cover 20 and through the second portion 34b of the slot 34 of the second support cover 30. The outside diameter of the cylinder 42 of the pin 40 is smaller than the distance between the sides of the first portion 34a of the slot 34 so that, during assembly, the pin 40 can be moved into the second portion 34b of the slot 34 through the first portion 34a of the slot 34.

As illustrated in FIG. 7, the cap 50 has a cylinder 51 and an end plate or bottom 52 integrally connected to one end of the cylinder 51. The cap 50 has no flange or brim at an opposite end of the cylinder 51. The cap 50 is spaced from the pin 40 and covers the pin 40 from outside. The cap 50 is welded to the second support cover 30 after the end portion of the cap 50 is fitted into the second portion 34b of the slot 34 until an axial end surface of the end portion of the cap 50 contacts a flange portion 63 of the buffer member 60.

Due to the no flange structure of the cap 50, the cap 50 can be inserted into the slot 34 from outside the second support cover 30 and the cylinder 51 of the cap 50 can be formed longer than if the cap were flanged, so that a load per unit area acting on the buffer member 60 is decreased.

As illustrated in FIG. 7, the buffer member 60 is disposed in a space defined between the first support cover 20 combined with the pin 40 and the second support cover 30 combined with the cap 50. The buffer member 60 is constructed of wire mesh so as to bear the high temperature of the exhaust pipe connected to the internal combustion engine.

Inside the bellows 10, a flow guide pipe 70 is disposed so that the exhaust gas flow does not contact the central portion 13 of the bellows 10 and flow resistance is not increased. The flow guide pipe 70 is fixed to an upstream end portion, for example, the second end portion 12 of the bellows 10 and extends toward a downstream end of the bellows 10.

Next, structures specific to each embodiment will be described.

As illustrated in FIGS. 1-3 and 7-9, the flexible joint in accordance with the first embodiment has a single bellows 10 and first and second covers 20A and 30A which have circular cross sections.

Further, the cap 50 may have a shaft 53 fixed to the bottom 52. The shaft 53 extends in an axial direction of the cap 50 within the cylinder 51 of the cap 50. The shaft 53 includes a straight portion 54 fixed to the bottom 52 of the cap by welding at one end of the straight portion 54 and a plate portion 55 integrally connected to another end of the straight portion 54. The straight portion 54 is radially spaced from the cylinder 51 of the cap 50 so that an annular space is defined between the straight portion 54 and the cylinder 51.

As illustrated in FIG. 7, the buffer member 60 includes a first portion 61 and a second portion 64 which have different coefficients of elasticity. The first portion 61 of the buffer member 60 is constructed of a wire mesh having a relatively high coefficient of elasticity (modulus of elasticity) for the purpose of bearing large loads. In contrast, the second portion 64 of the buffer member 60 has a relatively low coefficient of elasticity lower than that of the first portion 61 for the purpose of acting as an absorber. For example, the spring constant of the first portion 61 of the buffer member 60 is selected to be about 5,000 kg/mm and the spring constant of the second portion 64 of the buffer member 60 is selected to be about 100 kg/mm.

The first portion 61 and the second portion 64 are arranged in parallel with each other between the first support cover 20 combined with the pin 40 and the second support cover 30 combined with the cap 50. In the embodiment of FIG. 7, the first portion 61 of the buffer member 60 is disposed outside the pin 40 and the second portion 64 of the buffer member 60 is disposed inside the pin 40 and between the pin 40 and the shaft 53 of the cap 50. The second portion 64 of the buffer member 60 is precompressed in radial and axial directions of the second portion 64. elongated cross section squeezed at a central portion thereof.

Other structures of the fourth embodiment are the same as those of the third embodiment, and explanation about the same structural portions will be omitted.

Figure 8:
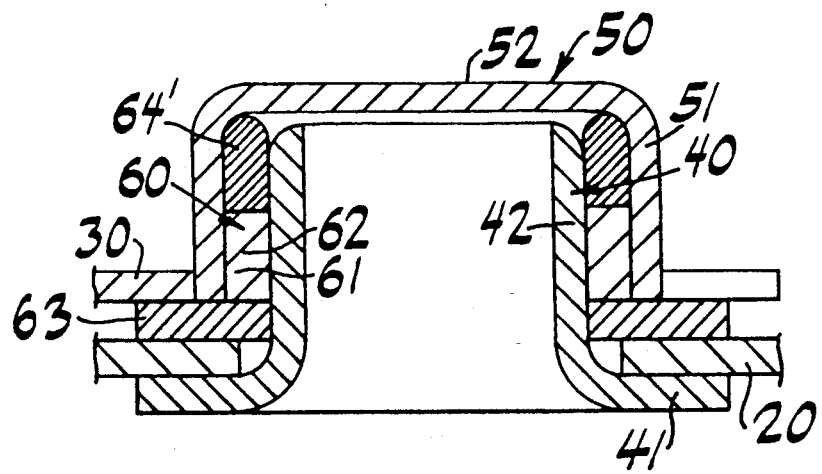
FIG. 8 is an enlarged cross-sectional view of one variation of the pin, cap and buffer member assembly applicable to both the joint in accordance with the first embodiment and the joint in accordance with the second embodiment.

Alternatively, in the variation of FIG. 8, which is also included in the first embodiment, both the first portion 61 and the second portion 64' of the buffer member 60 may be disposed outside the pin 40. The second portion 64' of the buffer member 60 is disposed between the cylinder 41 of the pin 40 and the cylinder 51 of the cap 50, precompressed in radial and axial directions of the second portion 64'.

The first portion 61 includes a flange portion 63 and a cylinder portion 62 which are constructed separately from each other. The flange portion 63 is disposed in an annular space defined between an outside surface of the first support cover 20 and an inside surface of the second support cover 30. The cylinder portion 62 is disposed in an annular space defined between an outside surface of the cylinder 41 of the pin 40 and an inside surface of the cylinder 51 of the cap 50.

As illustrated in FIGS. 4-6 and 7-9, the flexible joint in accordance with the second embodiment has double bellows 10, and the first and second covers 20B and 30B have As illustrated in FIG. 10, the flexible joint in accordance with the third embodiment has a single bellows 10, and the first and second cover 20A and 20B have circular cross sections, as in the first embodiment.

The cap 50 of the third embodiment does not have a shaft such as the shaft 53 of the first embodiment. The buffer member 60 of the third embodiment does not include a second portion such as the second portion 64 of the buffer member 60 of the first embodiment. The buffer member 60 of the third embodiment includes the first portion 61 only. The first portion 61 of the buffer member 60 of the third embodiment has two portions constructed separately from each other, i.e., the cylinder portion 62 and the flange portion 63, the same as the first portion 61 of the buffer member 60 of the first embodiment. In all embodiments, the cylinder portion 62 of the buffer member 60 has opposite open ends having no end plates.

Other structures of the third embodiment are the same as those of the first embodiment, and therefore, explanation about the same structural portions of the third embodiment will be omitted.

As illustrated in FIG. 11, the flexible joint in accordance with the fourth embodiment has double bellows 10, and the first and second covers 20B and 30B have an elongated cross section squeezed at a central portion thereof.

Other structures of the fourth embodiment are the same as those of the third embodiment, and explanation about the same structural portions will be omitted.

Operation and advantages of the flexible joint in accordance with each embodiment will now be explained.

First, operation and advantages of the first and second embodiments will be explained.

Loads acting on the flexible joint are born by the first and second support covers 20 and 30 connected by the pins 40. Therefore, an excessively large load does not act on the bellows 10. The connecting mechanism of the pins 40 provides a hinge connection between the two exhaust pipes. The first and second support covers 20 and 30 protect the bellows 10 from impact of stones, scraping against a road surface, and corrosion due to salt for melting snow.

Loads transmitted between the two exhaust pipes act on the pin 40, the cap 50, and the buffer member 60. The buffer member 60 has an elasticity and functions as a cushion and as an absorber against vibration. Due to installation of the buffer member 60, direct contact between the pin 40 and the cap 50 and between the first support cover 20 and the second support cover 30 is prevented, so that no sound due to metal to metal collision is generated. Further, since the buffer member 60 is constructed of wire mesh, a heat resistant characteristic is obtained.

At an early stage of use, since permanent deformation of buffer member 60 due to loads has not yet been generated, no gap yet exists between the the buffer member 60 and at least one of the pin 40 and the cap 50 and no rattling due to metal to metal contact occurs. In such a condition, as illustrated in FIG. 9, loads are transmitted mainly via the first portion 61 having a higher modulus of elasticity between the pin 40 and the cap 50.

Since vibrations due to the rolling and explosion stroke of the engine act on the exhaust pipes repeatedly, the first portion 61 having a higher coefficient of elasticity will finally incur a permanent deformation, and a gap will be generated between the first portion 61 and at least one of the pin 40 and the cap 50, though such a gap is small.

Once such a gap has been generated, the load transmission characteristic between the pin 40 and the cap 50 changes from that of the early stage of use. More particularly, as illustrated in FIG. 9, when the vibration amplitude is smaller than the generated gap, a load will be transmitted between the pin 40 and the cap 50 via the second portion 64 or 64' having a lower coefficient of elasticity. Since the second portion 64 or 64' has a low coefficient of elasticity, the second portion 64, 64' can absorb the gap and no gap will be generated between the second portion 64, 64' and at least one of the pin 40 and the cap 50. In contrast, when the vibration amplitude is equal to or greater than the generated gap, the load will be transmitted via both the first portion 61 and the second portion 64 or 64' of the buffer member 60. When both of the first and second portions of the buffer member 60 are effective, mainly the first portion 61 of the buffer member 60 transmits loads.

While the second portion 64, 64' of the buffer portion 60 effectively operates, energy (hatched portion of FIG. 9) defined as a product of the spring force and the deformation of the second portion 64, 64' is absorbed by the second portion 64, 64' and vibrations are damped due to a hysteresis which wire mesh has. Further, due to the spring force of the second portion 64, 64', a relative velocity between the pin 40 and the cap 50 is suppressed so that the collision force generated between the buffer member 60 and at least one of the pin 40 and cap 50 is weakened and generation of a collision sound will be effectively prevented. In this way, even if a small permanent gap is generated between the first member 61 and at least one of the pin 40 and the cap 50, no gap will be generated between the second member 64, 64' and at least one of the pin 40 and the cap 50, and generation of a sound due to metal to metal collision will be prevented.

For the purpose of increasing reliability and durability of the bearing portion, it is necessary to increase the density of the buffer member 60, to uniformly manufacture the buffer member 60, and to increase the area of the load bearing portion to reduce the load per unit area of the bearing.

Figure 12:
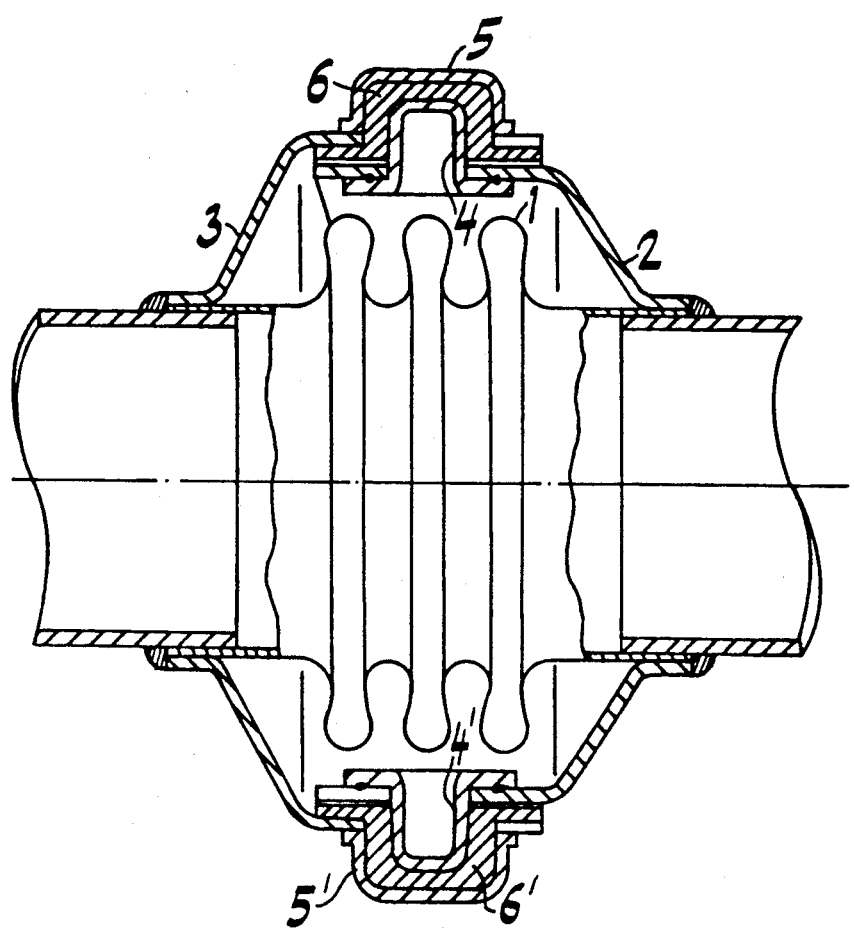
FIG. 12 is a cross-sectional view of a flexible joint proposed in Japanese Utility Model Application HEI 2-21841 filed on Mar. 6, 1990.

In the previous flexible joint of FIG. 12, the hat-configured buffer member is manufactured by pressing a wire mesh member having the form of a plate into the configuration of a hat. However, since the density of the crown of the hat is lowered during the press operation, it is difficult to obtain a sufficient durability and spring force of the crown portion, even though the crown portion is exposed to the severest load condition. In contrast, in the present invention, since the first portion 61 of the buffer member 60 has the cylinder portion 62 and the flange portion 63 which are constructed separately from each other, the cylinder portion 62 can be manufactured by rounding a wire mesh member having the form of a plate into the form of a cylinder or by cutting a wire mesh member having the form of a pipe, so that a sufficient density and uniformity of the cylinder portion 62 are obtained to increase reliability and durability.

Further, since the cylinder portion 62 and the flange portion 63 are manufactured independently of each other, the cylinder portion 62 can be made longer than would be possible with an integral flange portion 63. In the joint of FIG. 12, the length of the crown portion would be affected by the brim portion, and a round corner inevitably exists at the transition from the brim to the crown which further shortens the actual length of the crown, but in the present invention, the cylinder portion 62 does not receive such a restriction from the flange portion 63.

Further, in the joint of FIG. 12, since the pin having a closed end is manufactured by drawing from a flat plate, the attainable height of the crown is restricted. In contrast, in the present invention, since the pin 40 is open ended, the pin 40 can be manufactured from a tube by forming a flange at one end portion of the tube, so that the pin 40 can be manufactured to a desirable length to increase the load bearing area. Furthermore, since the cap of FIG. 12 includes a round corner at the transition from the flange to the cylinder, the round corner cannot support the buffer member. In contrast, in the present invention, since the cap 50 has no flange and the axial end surface of the cap 50 is pushed against the flange portion 63 of the buffer member 60, the cap 50 can support the buffer member 60 at all portions of the inside surface of the cylinder of the cap 50. Due to these structures, the load bearing area is increased and reliability and durability of the bearing portion are improved.

Next, operation and advantages of the third and fourth embodiments of the invention will be explained. The buffer member 60 of each of the third and fourth embodiments has the first portion 61 only. Since the first portion 61 is divided into two portions, i.e., the cylinder portion 62 and a flange portion 63, the buffer member 60 can be manufactured long and uniform in density, as discussed in connection with the first and second embodiments. Also, since the pin 40 has no closed end, the pin 40 can be manufactured longer as discussed in connection with the first and second embodiments. Further, since the cap 50 has no flange, the cap 50 also can be manufactured longer as discussed in connection with the first and second embodiments. Due to these structures, the load bearing area is large to prevent a large permanent deformation from being generated in the buffer member 60. As a result, generation of a gap and a rattling sound will be prevented so that reliability and durability of the flexible joint are improved.

Although several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A flexible joint for an exhaust pipe comprising:
   a bellows having an axis, a first end portion and an opposite second end portion;
   a first support cover having a first end portion fixed to the first end portion of the bellows and an opposite second end portion extending, outside the bellow, toward the second end portion of the bellows;
   a second support cover having a first end portion fixed to the second end portion of the bellows and an opposite second end portion extending, outside the first support cover, toward the first end portion of the bellows, the second support cover having a slot formed therein;
   a pin fixed to the first support cover and extending in a direction perpendicular to the axis of the bellows from the first support cover through the slot of the second support cover to extend outside of the second support cover;
   a cap spaced from the pin and fixed to the second support cover so as to cover the pin; and
   a first buffer member disposed in a space defined between the first support cover in combination with the pin and the second support cover in combination with the cap, the first buffer member having a first coefficient of elasticity; and
   a second buffer member disposed within the pin and arranged in parallel with the first buffer member, the second buffer member having a second coefficient of elasticity which is different from the first coefficient of elasticity.

2. A flexible joint according to claim 1, wherein the cap has a shaft that extends into the pin, and wherein the second buffer member is disposed between the shaft and the pin.

3. A flexible joint according to claim 1, wherein both the pin and the cap define cylindrical portions, respectively, and wherein the first buffer member is disposed between the cylindrical portion of the pin and the cylindrical portion of the cap.

4. A flexible joint according to claim 1, wherein the pin is constructed of a cylinder having open ends and a flange integrally connected to one end of the cylinder.

5. A flexible joint according to claim 1, wherein the cap is constructed of a cylinder and a bottom integrally connected to one end of the cylinder, the cylinder having no flange at another end of the cylinder.

6. A flexible joint according to claim 1, wherein the joint has a single bellows.

7. A flexible joint according to claim 1, wherein the joint has double bellows.

8. A flexible joint according to claim 1, wherein the first buffer member includes a cylinder portion and a flange portion which are constructed separately from each other and are constructed of wire mesh, wherein the cylinder portion of the first buffer member has open ends.

9. A flexible joint according to claim 8 wherein both the pin and the cap define cylindrical portions, respectively, and wherein the cylinder portion of the first buffer member being disposed between the cylindrical portion of the pin and the cylindrical portion of the cap, and wherein the flange portion of the first buffer member is disposed between the first support cover and the second support cover.

10. A flexible joint for an exhaust pipe comprising:
    a bellows having an axis, a first end portion and an opposite second end portion;
    a first support cover having a first end portion fixed to the first end portion of the bellows and an opposite second end portion extending, outside the bellows, toward the second end portion of the bellows:
    a second support cover having a first end portion fixed to the second end portion of the bellows and an opposite second end portion extending, outside the first support cover, toward the first end portion of the bellows, the second support cover having a slot formed therein;
    a pin fixed to the first support cover and extending in a direction perpendicular to the axis of the bellows from the first support cover to extend outside of the second support cover;
    a cap spaced from the pin and fixed to the second support cover so as to cover the pin; and
    a buffer member disposed in a space defined between the first support cover in combination with the pin and the second support cover in combination with the cap, the buffer member including a cylinder portion and a flange portion which are constructed separately from each other and are constructed of wire mesh.

11. A flexible joint according to claim 10, wherein the joint has a single bellows.

12. A flexible joint according to claim 10, wherein the joint has double bellows.

13. A flexible joint for an exhaust pipe comprising:
    a bellows having an axis, a first end portion and an opposite second end portion;
    a first support cover, an inner end of which is coupled to the first end portion of the bellows, wherein an outer end of the first support cover extends, outside the bellows, toward the second end portion of the bellows;
    a second support cover, a first end of which is coupled to the second end portion of the bellows, wherein an outer end of the second support cover extends, outside the bellows, toward the outer end of the first support cover; and
    a first buffer member and a second buffer member, each buffer member being located between the outer end of the first support cover and the outer end of the second support cover, wherein the first and second buffer members have different coefficients of elasticity.

14. A flexible joint according to claim 13, wherein the first support member includes a cylindrical pin which extends along a pin axis which is substantially perpendicular to the axis of the bellows away from the bellows to a peripheral end and wherein the second support member includes a cap which extends around the peripheral end of the pin.

15. A flexible joint according to claim 14, wherein the cylindrical pin defines an outer cylindrical surface and wherein the cap defines an inner cylindrical surface separated from the outer cylindrical surface of the pin to define an annular space and, wherein both the first and second buffer members are located within the annular space.

16. A flexible joint according to claim 14, wherein the cap includes a projecting member which extends into the pin and wherein the first buffer member is located outside of the pin and the second buffer member is located within the pin, between an inner surface of the pin and the projecting member.

* * * * *

UNITED STATES PATENT AND TRADEMARK OFFICE
CERTIFICATE OF CORRECTION

PATENT NO. : 5,318,329
DATED : June 7, 1994
INVENTOR(S) : Kenji SUZUKI, et al.

It is certified that error appears in the above-identified patent and that said Letters Patent is hereby corrected as shown below:

Column 5, lines 58-62, delete "elongated cross section squeezed at a central portion thereof.

Other structures of the fourth embodiment are the same as those of the third embodiment, and explanation about the same structural portions will be omitted."

Column 6, line 15, after "have" insert --an elongated cross section squeezed at a central portion thereof.

Other structures of the second embodiment are the same as those of the first embodiment, and explanation about the same structural portions will be omitted.--

Column 9, line 10, change "low," to --lows,--.

Signed and Sealed this

First Day of November, 1994

Attest:

BRUCE LEHMAN

*Attesting Officer*     *Commissioner of Patents and Trademarks*